United States Patent
Bechtel et al.

(10) Patent No.: US 11,351,497 B2
(45) Date of Patent: Jun. 7, 2022

(54) METHOD AND AN APPARATUS FOR SEPARATING CHLORINE GAS FROM A GASEOUS ANODE OUTLET STREAM OF AN ELECTROCHEMICAL REACTOR

(71) Applicant: MAX-PLANCK-GESELLSCHAFT ZUR FÖRDERUNG DER WISSENSCHAFTEN E.V., Munich (DE)

(72) Inventors: Simon Bechtel, Magdeburg (DE); Tanja Vidakovic-Koch, Biederitz (DE); Kai Sundmacher, Helmstedt (DE)

(73) Assignee: MAX-PLANCK-GESELLSCHAFT ZUR FÖRDERUNG DER WISSENSCHAFTEN E.V., Munich (DE)

( * ) Notice: Subject to any disclaimer, the term of this patent is extended or adjusted under 35 U.S.C. 154(b) by 197 days.

(21) Appl. No.: 16/767,437

(22) PCT Filed: Nov. 28, 2018

(86) PCT No.: PCT/EP2018/082752
§ 371 (c)(1),
(2) Date: May 27, 2020

(87) PCT Pub. No.: WO2019/105955
PCT Pub. Date: Jun. 6, 2019

(65) Prior Publication Data
US 2021/0077947 A1 Mar. 18, 2021

(30) Foreign Application Priority Data
Nov. 28, 2017 (EP) .................................... 17203967

(51) Int. Cl.
*B01D 3/14* (2006.01)
*B01D 11/04* (2006.01)
*B01D 53/14* (2006.01)
*B01D 53/18* (2006.01)
*C01B 7/07* (2006.01)
*C25B 1/26* (2006.01)
*C25B 15/08* (2006.01)

(52) U.S. Cl.
CPC ......... *B01D 53/1425* (2013.01); *B01D 3/143* (2013.01); *B01D 11/0488* (2013.01); *B01D 53/18* (2013.01); *C01B 7/0731* (2013.01); *C01B 7/0743* (2013.01); *C25B 1/26* (2013.01); *C25B 15/08* (2013.01); *B01D 2252/205* (2013.01); *B01D 2252/2056* (2013.01); *B01D 2252/30* (2013.01); *C01B 2210/0025* (2013.01); *C01P 2006/80* (2013.01)

(58) Field of Classification Search
CPC .... B01D 53/18; B01D 53/14; B01D 53/1425; B01D 2257/2047; B01D 2259/45; B01D 2252/2056; B01D 3/143; B01D 11/0488; B01D 2256/26; B01D 53/002; B01D 2252/30; B01D 2252/205; B01D 2252/20; C01P 2006/80; C01B 7/0743; C01B 7/0731; C01B 2210/0025; C25B 15/08; C25B 1/26
See application file for complete search history.

(56) References Cited

U.S. PATENT DOCUMENTS

| | | | |
|---|---|---|---|
| 2,398,891 A | | 10/1942 | Julien et al. |
| 4,247,532 A | * | 1/1981 | Saletan ................. C01B 7/0743 423/500 |
| 4,477,322 A | * | 10/1984 | Foller ..................... C25B 11/04 205/556 |
| 5,580,437 A | | 12/1996 | Trainham, III et al. |
| 6,063,162 A | | 5/2000 | Orosz et al. |

(Continued)

FOREIGN PATENT DOCUMENTS

| | | |
|---|---|---|
| CA | 2 5793 64 A1 | 8/2008 |
| DE | 10 2006 023 581 A1 | 11/2007 |

(Continued)

OTHER PUBLICATIONS

Bechtel et al: "Integrated Process and Ionic Liquid Design by Combining Flowsheet Simulation with Quantum-Chemical Solvent Screening", Proceedings of the 13th International Syposium on Process Systems Engineering—PSE 18, Jul. 5, 2018.

*Primary Examiner* — Timothy C Vanoy
(74) *Attorney, Agent, or Firm* — WC&F IP

(57) ABSTRACT

The invention relates to a method for separating chlorine from a gaseous anode outlet stream mass flow of an electrochemical cell reactor. In a first aspect, the method makes use of an absorption step, wherein an anode outlet stream mass flow of the electrochemical cell reactor is exposed to an organic solvent being essentially immiscible with water for achieving an exergy-efficient separation of chlorine and hydrogen chloride. In a further aspect, the method makes use of absorption step, wherein the anode outlet stream mass flow is exposed to an ionic liquid, wherein the hydrogen chloride is dissolved in said ionic liquid, thereby forming a gas flow containing essentially chlorine and a solution mass flow comprising the ionic liquid and the hydrogen chloride. The hydrogen chloride is desorbed from the solution mass flow in a desorption step. In another aspect, the method makes use of a distillation step, wherein the anode outlet stream mass flow is separated at a static pressure of at least 2 bar for an exergy-efficient separation.

22 Claims, 3 Drawing Sheets

(56) References Cited

U.S. PATENT DOCUMENTS 8,153,838 B2 4/2012 Bulan et al.
2021/0189572 A1* 6/2021 Schmid .................. C25B 15/08

FOREIGN PATENT DOCUMENTS

| DE | 10 2013 003 230 A1 | 12/2014 |
|----|--------------------|---------|
| EP | 0 767 138 A1 | 4/1997 |
| EP | 2 599 770 A1 | 6/2013 |
| JP | 3193627 | 5/2001 |

* cited by examiner

METHOD AND AN APPARATUS FOR SEPARATING CHLORINE GAS FROM A GASEOUS ANODE OUTLET STREAM OF AN ELECTROCHEMICAL REACTOR

The invention relates to a method for separating chlorine from a gaseous anode outlet stream mass flow of an electrochemical cell reactor. In a first aspect, the method makes use of an absorption step, wherein an anode outlet stream mass flow of the electrochemical cell reactor is exposed to an organic solvent for achieving an exergy-efficient separation of chlorine and hydrogen chloride by dissolving the chlorine in the organic solvent. In a further aspect, the method makes use of absorption step, wherein the anode outlet stream mass flow is exposed to an ionic liquid, wherein the hydrogen chloride is dissolved in said ionic liquid, thereby forming a gas flow containing essentially chlorine and a solution mass flow comprising the ionic liquid and the hydrogen chloride. The hydrogen chloride is desorbed from the solution mass flow in a desorption step. In another aspect, the method makes use of a distillation step, wherein the anode outlet stream mass flow is separated at a static pressure of at least 1 bar, like at least 2 bar for an exergy-efficient separation.

PRIOR ART

Chlorine is needed as a base chemical for numerous synthesis methods, e.g. for the industrial production of polycarbonate and isocyanate, such as methylene diisocyanate and toluene diisocyanate. In these synthesis methods, phosgene is employed in reaction steps, thereby consuming chlorine on the one hand and emerging hydrogen chloride as a byproduct. The hydrogen chloride as a byproduct exceeds the need in other chemical processes, therefore recycling of the chlorine from the hydrogen chloride is favorable.

In the prior art, recycling of the chlorine is performed by heterogeneously catalyzed conversion of hydrogen chloride to chlorine, having the disadvantage of high investment costs. An electrochemical conversion of hydrogen chloride provides the advantages of both modularity in small-scale plants and flexibility concerning the production capacity. One variant for electrochemical conversion of the hydrogen chloride is a diaphragm electrolyzer technology, converting the hydrogen chloride being fed as an aqueous hydrochloric acid feed stream.

U.S. Pat. No. 8,153,838 B2 discloses a more exergy-efficient variant of the electrolyzer technology with a membrane, said technology being already applied at industrial scale by Bayer and Uhdenora. Further details of the process are disclosed in "Hydrochloric acid electrolysis sustainable chlorine production" by ThyssenKrupp Uhde GmbH in the year 2012.

U.S. Pat. No. 5,580,437 A discloses a further variant for the electrochemical conversion in a gas phase process, wherein gaseous hydrogen chloride is lead to an anode at a membrane permeable for protons. An anode outlet stream comprising chlorine and unconverted hydrogen chloride is formed by oxidation of the hydrogen chloride at the anode, whereby the protons diffuse through the membrane to a cathode and react with a cathode gas comprising oxygen or an oxygen-comprising gas, thereby forming water. Separation of chlorine from the unreacted hydrogen chloride in the anode outlet stream is proposed by a separator, the separation involving generally e.g. distillation, adsorption, extraction or membrane separation.

DE 10 2013 009 230 A1 discloses an electrochemical cell for the conversion of hydrogen chloride to chlorine and water in a gas-phase reaction and proposes to humidify the cathode gas comprising oxygen or an oxygen-comprising gas for better proton conductivity of the membrane.

DESCRIPTION OF THE PRESENT INVENTION

The object of the present invention is to provide a method and an apparatus for separating chlorine from a gaseous anode outlet stream mass flow of an electrochemical cell reactor with a small exergy demand.

It has been found out that a reduction of the exergy demand is achievable by applying a separation step making use of an organic solvent in an absorption step. Therefore, the invention provides a method for separating chlorine from a gaseous anode outlet stream mass flow of an electrochemical cell reactor, said anode outlet stream mass flow essentially comprising chlorine and anhydrous hydrogen chloride. The method comprises an absorption step a), wherein the anode outlet stream mass flow is exposed to an organic solvent which is essentially immiscible with water. Thereby, a solution mass flow comprising the organic solvent is formed, said organic solvent containing the chlorine and a part of the hydrogen chloride. The chlorine and the part of hydrogen chloride both are dissolved in said organic solvent. Furthermore, a gas flow containing essentially hydrogen chloride is formed. The use of the organic solvent according to the invention makes the solution applicable to exergy-efficient separation of the chlorine in a subsequent desorption step.

The organic solvent according to the present invention is an organic solvent being essentially immiscible with water. In an aspect, the organic solvent is a non-polar solvent. E.g., non-polar solvents are defined as having a dielectric constant of less than 15.

The electrochemical cell reactor is to be understood as to comprises an anode and a cathode being separated by a membrane, said membrane being permeable for protons and, of course, water. Therein, an electrical potential is applied between the cathode and the anode by an electrical power source. The membrane does split up the electrochemical cell into two half-cells generally being connected only with respect to protons due to the permeability for said protons. A gaseous hydrogen chloride steam is fed into the anode-side half-cell of the electrochemical cell reactor, the anode by means of the power source oxidizes the hydrogen chloride forming chlorine and protons. The protons diffuse through the membrane to the cathode. A cathode gas is fed into the cathode-side half-cell of the electrochemical cell reactor. For example. In one embodiment, the cathode gas comprises oxygen which may be humidified. At the cathode, the oxygen of the cathode gas is reduced by the electrical power source, thereby forming water with the diffused protons from the anode side as a product of the cathode-side half-cell. Alternatively, the protons are reduced at the cathode to hydrogen.

In the electrochemical cell, the hydrogen chloride being fed at the anode-side of the electrochemical cell reactor is essentially dry. This allows for an exergy saving combination with the absorption step according to the invention with an advantageous balance of exergy.

The absorption step is to be understood for example to be conducted in an absorption column, particularly an absorption column with bubble trays, sieve bottoms, or a packed absorption column. The absorption column is arranged such as to allow for a good mass transfer from the anode outlet stream mass flow into the organic solvent concerning the chlorine being contained in the anode outlet stream mass flow. Usually, the gas flow does leave an absorption column at the head. The solution mass flow usually leaves an absorption column at the bottom. The anode outlet stream mass flow usually will be led into the absorption column's bottom for ascending the column. The organic solvent mass flow usually is led into the column's head. The anode outlet stream mass flow and the organic solvent mass flow by these means form a countercurrent flow for a good mass transfer of the chlorine into the organic solvent.

The absorption step according to the invention allows for direct recycling of the gas flow containing essentially hydrogen chloride into the electrochemical cell reactor. Thereby, a high overall conversion of hydrogen chloride can be achieved with different possible single-pass conversions in the electrochemical cell reactor, hence a low cell potential is possible.

The absorption step, due to the lack of dissociation of the hydrogen chloride in an organic solvent, therefore implies a reduced production of solution entropy and therefore a reduced loss of Gibbs enthalpy of the hydrogen chloride which can be recycled without a further cost or energy consuming processing. Thus, also investment expenses are low.

In the absorption step, a further saving of exergy can be achieved by adjustment of the organic solvent's mass flow to a minimum being just necessary for achieving the absorption of essentially all the chlorine into the solution mass flow. This allows for direct recycling of a large fraction of the hydrogen chloride from the anode outlet stream mass flow.

The necessary amount of organic solvent in the absorption step can be reduced by compressing the anode outlet stream mass flow prior to exposing it to the organic solvent. This allows for additionally savings of exergy. In spite of the higher consumption of electricity for the compression, the exergy consumption in total has been found out to be reduced when taking into account the necessity of boiling a correspondingly smaller amount of organic solvent. An advantageous static pressure of the absorption has turned out to be at least 1 bar, at least, 2 bar, like at least 8 bar.

Further, the method with step a) involving an organic solvent additionally comprises an extraction step b) and a desorption step c). In the extraction step b), the solution mass flow obtained in step a) is exposed to a water mass flow, thereby forming an aqueous hydrogen chloride mass flow comprising essentially the water mass flow and hydrogen chloride extracted from said solution. Thus, a purified solution mass flow is formed, said purified solution mass flow being composed of the organic solvent and the chlorine. In the desorption step c), the chlorine is desorbed from the purified solution mass flow obtained in the extraction step b). The combination of the extraction step and the desorption step c) leads to a high purity of the desorbed chlorine, allowing for recycling of said chlorine and for its usage as product for chemical synthesis steps, e.g. in synthesis processes for the production of polycarbonate and isocyanates, such as Methylene diphenyl diisocyanate and toluene diisocyanate.

The extraction step can be performed in a device for extraction. The device for extraction is to be understood as a device for exposing the solution mass flow to a water mass flow with a large interphase. The organic solvent is essentially not soluble in water and vice versa. Therefore, the entire extraction step can be performed for example in a mixer-settler device, wherein a mixing component of the mixer-settler device applies said interphase for a good mass transport of the hydrogen chloride from the solution mass flow into the water mass flow. After said mass transport is achieved, separation of the aqueous hydrogen chloride mass flow, which is non-soluble in the solution mass flow and the purified solution mass flow, and the purified solution mass flow is performed due to differences in density in the settling component of the mixer-settler device. The purified solution mass flow and the aqueous hydrogen chloride mass flow are discharged from the device for extraction.

The purified solution mass flow is exposed to a desorption step, for example in a desorption column, wherein the purified solution mass flow is boiled, thereby forming a liquid organic solvent mass flow and an essentially gaseous chlorine mass flow.

In addition, the present inventors recognized that usage of an ionic liquid in an absorption step for separating chlorine from the gaseous anode outlet stream mass flow is surprisingly exergy-efficient. Thus, the present invention discloses a method for separating chlorine from a gaseous anode outlet stream mass flow of an electrochemical cell reactor, said anode outlet stream mass flow essentially comprising chlorine and anhydrous hydrogen chloride, comprising an absorption step a) and a desorption step b). In the absorption step a), the anode outlet stream mass flow is exposed to an ionic liquid, thereby forming a solution mass flow. The solution mass flow comprises the ionic liquid, said ionic liquid containing the hydrogen chloride dissolved in said ionic liquid. Thereby, a gas flow is formed, said gas flow containing essentially chlorine. In the desorption step b), the hydrogen chloride is desorbed from the solution mass flow obtained by reduction of pressure and/or raising the temperature.

As used herein, the term "ionic liquid" refers to a salt in a liquid state. Ionic liquids are also known as ionic melts, liquid salts, fused salts or ionic glasses. The ionic liquids are selected to not react with at least one of HCL, $CL_2$ or $H_2O$. Examples of ionic liquids include diethyl-methylsulfonium-methanesulfonate, triethylsulfonium-thiocyanate, triethylsulfonium-dicyanamide, diethyl-methylsulfonium-thiocyanate, ethyldimethylsulfonium-thiocyanate, diethyl-methylsulfonium-dicyanamide, ethyl-dimethylsulfonium-dicyanamide, ethyl-dimethylsulfonium-methylsulfate, diethyl-methylsulfonium-methylsulfate, triethylsulfonium-ethylsulfate, diethyl-methylsulfonium-ethylsulfate, ethyl-dimethylsulfonium-ethylsulfate, triethylsulfonium-methoxyethylsulfate, triethylsulfonium-2-(2-methoxyethoxy)ethylsulfate, trihexyl(methoxymethyl)phosphonium-methylsulfate, triethylsulfonium-tricyanomethane, diethyl-methylsulfonium-tricyanomethane, ethyl-dimethylsulfonium-tricyanomethane, hexadecyl-trihexyl-phosphonium-hydrogensulfate, tributylmethylphosphonium-tricyanomethane, butyl-trihexylphosphonium-tricyanomethane, trihexyl(methoxymethyl) phosphonium-tricyanomethane, trihexyl(methoxymethyl) phosphonium-trifluoromethane-sulfonate, tetrahexyl-phosphonium-tricyanomethane, heptyl-trihexyl-phosphonium-tricyanomethane, tributyl-tetradecylphosphonium-tricyanomethane, trihexyl-octyl-phosphonium-tricyanomethane, decyl-trihexyl-phosphonium-tricyanomethane, dodecyl-trihexyl-phosphonium-tricyanomethane, trihexyl-tetradecyl-phosphonium-tricyanomethane, hexadecyl-trihexyl-phosphonium-tricyanomethane, triethylsulfonium-trifluoromethylsulfonylimide, diethyl-methylsulfonium-trifluoromethylsulfonylimide, ethyl-dimethylsulfonium-trifluoromethylsulfonylimide, triethylsulfonium-bis (pentafluoroethylsulfonyl)amide, diethyl-methylsulfonium-bis(pentafluoroethylsulfonyl)amide, ethyl-dimethylsulfonium-bis(pentafluoroethylsulfonyl)amide, trihexyl(methoxymethyl)phosphonium-trifluoromethyl-sulfonylimide, trihexyl(methoxymethyl)phosphonium-bis (pentafluoroethylsulfonyl)amide.

Then, the ionic liquid and the hydrogen chloride can be compressed to atmospheric pressure. The desorption step can be carried out at a low pressure, in particular at a pressure in the range of 0 to 100 mbar. The compression of the desorbed hydrogen chloride can be performed in several steps with intermediate cooling. The temperature in the desorption step is chosen to be below the decomposition temperature of the ionic liquid.

Thus, between the device for absorption and the desorption column, whereby the desorption column basically can be a single stage column (flash), there must be installed a pressure equipment for decreasing the pressure, such as a throttle and/or a vacuum pump or another pump (e.g. a membrane or piston pump). Usually, the pressure change is applied by one or more compressors and/or one or more pumps discharging the streams from the desorption device. When reducing the pressure of the solution mass flow comprising the ionic liquid containing the hydrogen chloride, heat must be supplied at the same time in order to avoid cooling down the ionic liquid below its freezing point. Thus, if the ionic liquid has a freezing point close to room temperature, the pressure decrease by expansion cannot be adiabatic but a low temperature heat supply may be necessary. This can be simply water at room temperature, which does not lead to any additional exergy costs.

The absorption of the hydrogen chloride in the ionic liquid can be carried out at pressures between 0.5 and 3 bar, like 0.5 to 2 bar, in particular 0.8 to 1.2 bar, like 1.0 bar or 1.0 atm.

The ionic liquid mass flow should be chosen in a way that it is sufficient to absorb essentially all of the hydrogen chloride, while not being too high, since then also chlorine dissolves in significant amounts. If for some reasons there is too much chlorine absorbed, the hydrogen chloride being desorbed from the ionic liquid later on will also contain small amounts of chlorine. For reactor recycling this is not a problem. However, if parts of the hydrogen chloride are absorbed in water to form aqueous hydrogen chloride, then the contained chlorine will mostly not be absorbed but will leave the absorber as a humid chlorine gas stream. This gas stream could then be dried in a subsequent drying step, e.g. with sulfuric acid. The chlorine thus obtained can be combined with the chlorine product stream from the absorption column. This option is feasible when the selectivity of the absorption of hydrogen chloride is not high enough in that small amounts of chlorine will be absorbed in the ionic liquid as well.

Surprisingly, it has been found out that a distillation step at an increased static pressure allows for an exergy-efficient separation of chlorine and hydrogen chloride. Therefore, according to the invention a method for separating chlorine from a gaseous anode outlet stream mass flow of an electrochemical cell reactor, said anode outlet stream mass flow essentially comprising chlorine and anhydrous hydrogen chloride is described, said method comprising a distillation step, wherein the anode outlet stream mass flow is separated at a static pressure of at least 1 bar, like at least 2 bar. Thereby, an overhead product mass flow comprising the hydrogen chloride and a bottom product mass flow comprising the chlorine is formed. The static pressure of at least 1 bar, like at least 2 bar allows for an exergy-efficient separation. In particular, implementation of an ammonia cooling cycle for condensing the overhead product is possible at a static pressure in the range between 3 to 5 bar.

The distillation step also allows for flexible alteration of the intensity of the anode outlet stream mass flow without changing the design parameters of the distillation process except the throughput of the distillation device being used for the distillation step. Thus, the distillation step allows for variation of the overall conversion by varying the parameters of the electrochemical reactor. For this reason, the method according to the present invention allows for variation of the load of hydrogen chloride being subject to the conversion by electrolysis without modification of the plant. This makes the method quantitatively flexible for the load of hydrogen chloride.

The distillation device is to be understood to be for example a distillation column, in particular an absorption column with bubble trays, sieve bottoms, or a packed distillation column. The anode outlet stream mass flow is usually fed into the column between the head and the bottom or sump. The chlorine and the hydrogen chloride are then separated due to their difference in fugacity, forming the higher boiling liquid bottom product mass flow at the bottom and the lower boiling overhead product mass flow at the head of the column. In an embodiment, cooling of the head for condensing the overhead product can be achieved by an ammonia cooling cycle. In this case, a pressure of at least 3 bar is desired.

In one embodiment of a method according to the present invention comprising the distillation step including a distillation device, like a distillation column, the condenser temperature in the distillation column is at or above 195 K, like above 200 K. Thus, a reduction of exergy demand is achieved. Furthermore, cooling at the condenser can be implemented easier and with less technical efforts.

In an advantageous embodiment of the method according to the present invention comprising the distillation step, the static pressure in the distillation device is of at least 1 bar, like at least 2 bar, e.g. at least 4, at least 6, at least 8 bars. Further, the static pressure should not exceed 12 bar. This allows for a reduced exergy demand coming along with a higher pressure.

With respect to the distillation column of the present distillation process base on calculating purity of at least 99.5%, it is preferred that said distillation column has a theoretically plate number of at least 10, e.g. between 10 and 20, like between 10 to 17, including 11 to 17 plate numbers. Moreover, the reflux ratio in the column, namely, the molar reflux ratio is between 3.2 and 3.5, like 3.24 to 3.3, in case of an 80% single pass conversion in the electrochemical reactor In case of 60% single pass conversion, the reflux ratio may be in the range of 1.3 to 1.5, like 1.35 to 1.4. In case of 30% single pass transfer in the reactor, the molar reflux ratio may be in the range of 0.5 to 0.6, like 0.55 to 0.58.

In one embodiment of the method according to the present invention comprising step a) involving an organic solvent according to invention, the organic solvent is a non-polar organic solvent selected from aromatic solvents, halogenated alkanes, alkanes and cycloalkanes including chloroform, benzene, toluene and octane. In an embodiment, the organic solvent is an alkane or a cycloalkane and derivatives thereof being derivatized with halogens. Further, aromatic compounds are preferred including benzene or toluene. Typically, alkane or cycloalkane which may optionally be substituted with halogens represent a preferred embodiment. It is preferred that the boiling point of the organic solvent is below or not significantly above the boiling point of water. Further, short chain alkanes have an increased solubility in water, thus, it is preferred that the alkane solvents are alkane solvents having at least four, five or at least six C-atoms. It is preferred that the organic solvent is a $C_6$, $C_7$ or $C_8$ alkane including hexane, heptane and octane. In further embodiments of the method comprising step a) involving an organic solvent according to invention, the organic solvent is or comprises carbon disulfide or derivatives thereof. Further, alkenes including halogenated alkenes may be used.

In one embodiment of the methods according to the invention, the separated hydrogen chloride is at least partly recycled to the inlet of the anode of the electrochemical cell reactor. This allows for a reduction of disposal hydrochloric acid and for an economization with respect to the overall net consumption of hydrogen chloride.

In one embodiment of the methods according to the invention, the separated hydrogen chloride is at least partly converted into a concentrated hydrochloric acid solution. This allows for an economic utilization of at least a part of the unconverted hydrogen chloride. In particular the aqueous hydrogen chloride mass flow can be enriched with hydrogen chloride until a concentrated hydrogen chloride solution is achieved for economic utilization.

In one embodiment of the method comprising step a) involving an organic solvent according to the invention, the desorption step c.) is a distillation step. This allows for separation by application of heat energy. In particular a combination with an increased static pressure in the absorption step a) as mentioned above does allow for a low exergy consumption.

In an embodiment of the method including an organic solvent, the distillation is conducted at atmospheric pressure or below atmospheric pressure.

In one embodiment according to the invention, the conversion rate of hydrogen chloride to chlorine in the electrochemical reactor is in between 30% to 90%, particularly between 50% to 80%. These have turned out to be ranges of the conversion rate with an exceptional low overall exergy consumption for an integrated process with an electrochemical cell reactor and a method for separating chlorine according to the invention.

In one embodiment according to the invention, the purity of the separated chlorine is at least 98%, like 99%, e.g. at least 99.5%.

Further with respect to immiscible, the term "essentially" is to be understood as to refer to an miscibility of less than 5%, like less than 1%, e.g. 1000 ppm at most of one solvent present in the other solvent. For example, the water is present at most in 1000 ppm in the organic solvent, e.g. at most 500 ppm, like at most 100 ppm.

As used here with respect to impurities, the term "essentially" is to be understood as to involve a degree of impurities of less than 1%, in particular of less than 1000 ppm, like less than 100 ppm.

The invention further relates to an apparatus for separating chlorine from a gaseous anode outlet stream mass flow. The apparatus comprises an electrochemical reactor having an anode outlet of a gaseous anode outlet stream comprising chlorine and hydrogen chloride, a cathode outlet, an anode inlet and a cathode inlet.

The apparatus further comprises a first absorber connected with the outlet of a gaseous anode outlet stream by a gaseous anode outlet stream line allowing absorption of chlorine in an organic solvent introduced into the absorber by a solvent providing inlet. The absorber has an inlet for introducing the gaseous anode outlet stream into the absorber and a first outlet for an organic solvent containing essentially chlorine and a part of hydrogen chloride. The absorber also has a second outlet for essentially the gaseous hydrogen chloride.

The apparatus also comprises a device for applying an extraction step to the organic solvent containing essentially chlorine and a part of hydrogen chloride, thereby forming i) an aqueous hydrogen chloride mass flow and ii) a purified solvent mass flow containing chlorine. Moreover, the apparatus comprises a desorption device for separating the chlorine from the organic solvent present in the purified solvent mass flow.

Optionally, the aforementioned apparatus comprises a second absorber connected by a line with the first absorber and/or the device for extraction for absorbing at least part of hydrogen chloride obtaining concentrated aqueous hydrogen chloride.

Optionally, the aforementioned apparatus comprises a recycling line for the transport of hydrogen chloride from the first absorber to the anode inlet of the electrochemical reactor.

The apparatus—comprising or not comprising the aforementioned optional components—is adapted for conducting the method according to the invention, thereby bringing out the advantages discussed for the method according to the invention.

The invention also relates to an apparatus for separating chlorine from a gaseous anode outlet stream mass flow. The apparatus comprises an electrochemical reactor having an anode outlet of a gaseous anode outlet stream comprising chlorine and hydrogen chloride, a cathode outlet, an anode inlet and a cathode inlet.

The apparatus furthermore comprises a distillation device connected with the outlet of a gaseous anode outlet stream by a gaseous anode outlet stream line allowing distillation of the gaseous anode outlet stream into an overhead product mass flow essentially comprising hydrogen chloride and a bottom product mass flow essentially comprising chlorine. If necessary, a compressor or pumps is present between the outlet and the distillation device altering and controlling the pressure in the distillation device, e.g. the distillation column.

The distillation device, e.g. the distillation column, is designed to have a theoretical plate number in between 10 to 20 theoretical plate numbers, like 10 to 17, e.g. 11 to 17 taking a purity of 99.5% as a basis. Further, depending on the single pass transfer. For example, in case of 80% single pass conversion in the reactor, the plate number is in between 10 to 20, like 11 to 17 with a molar reflux ratio of in between 3.0 to 3.8, like 3.24 to 3.3. In case of 60% single pass conversion in the reactor, the plate number is in between 10 to 20, like 11 to 17 with a molar reflux ratio of in between 1.3 to 1.5, like 1.35 to 1.4. In case of 30% single pass conversion in the reactor, the plate number is 10 to 20, like 10 to 17 with a molar reflux ratio of in between 0.5 to 0.6, like 0.55 to 0.58.

Optionally, the apparatus comprises an absorber connected by a line with the head of the distillation device for absorbing at least part of hydrogen chloride present in the overhead product mass flow obtaining concentrated aqueous hydrogen chloride.

Optionally, the apparatus comprises a recycling line for the transport of hydrogen chloride to the anode inlet of the electrochemical reactor.

The apparatus—comprising or not comprising the aforementioned optional components—is adapted for conducting the method involving an ionic liquid according to the invention, thereby bringing out the advantages being discussed for the method according to the invention.

The invention also relates to an apparatus for separating chlorine from a gaseous anode outlet stream mass flow based on the use of an ionic liquid. The apparatus comprises an electrochemical reactor having an anode outlet of a gaseous anode outlet stream comprising chlorine and hydrogen chloride, a cathode outlet, an anode inlet and a cathode inlet.

The apparatus furthermore comprises a first absorber connected with the outlet of a gaseous anode outlet stream by a gaseous anode outlet stream line allowing absorption of hydrogen chloride in an ionic liquid introduced into the absorber by an ionic liquid providing inlet. The absorber has an inlet for introducing the gaseous anode outlet stream into the absorber and a first outlet for the ionic liquid containing hydrogen chloride and a second outlet for essentially the gaseous chlorine.

The apparatus comprises a desorption device for separating the hydrogen chloride from the ionic liquid present in the solvent mass flow. For example, the desorption device is a heating device wherein desorption of hydrogen chloride after or during heating is affected. In particular, the heating device may be a flash or a series of flash. In particular, the heating device can be a vapor.liquid separator, like a flashdrum or a series of flashdrums.

Optionally, the apparatus comprises a recycling line for the transport of hydrogen chloride from the desorption device to the anode inlet or the electrochemical reactor, adapted for conducting a method according to the invention.

In a further embodiment of one of the aforementioned apparatuses, the apparatus comprises a pressure equipment for applying pressure in the distillation device, heating device or the absorber, if necessary. The pressure equipment is to be understood as to be devices for increasing or lowering a pressure, for example compressors, pumps, in particular vacuum pumps.

The pressure equipment, in particular the vacuum pumps, can be arranged such that a pressure decrease of the solution mass flow involving an ionic liquid is applied in the desorption step. Thus, a good mass transport during desorption is achieved. In an advantageous embodiment, the pressure is reduced to a low vacuum by the pressure equipment for conduction of the desorption step. After performance of the desorption step, the pressure of the desorbed hydrogen chloride gas and of the ionic liquid can be raised by one or more compressors or pumps (for the ionic liquids) and optionally one or more heat exchangers being installed after or between the compressors or pumps, generating a pressure of the ionic liquid and/or of the desorbed hydrogen chloride gas of e.g. 1 atm, typically similar to the pressure present in the absorption device e.g. the absorption column and the reactor.

A high overall exergy-efficiency is achieved in all apparatuses by energy-integration of heat flows, e.g. of heat flows at the heads and sumps of columns and/or at heat exchangers for changing properties of streams.

In the following, examples of embodiments of the invention are discussed, making reference to the following drawings. The drawings show as follows.

Figure 1:
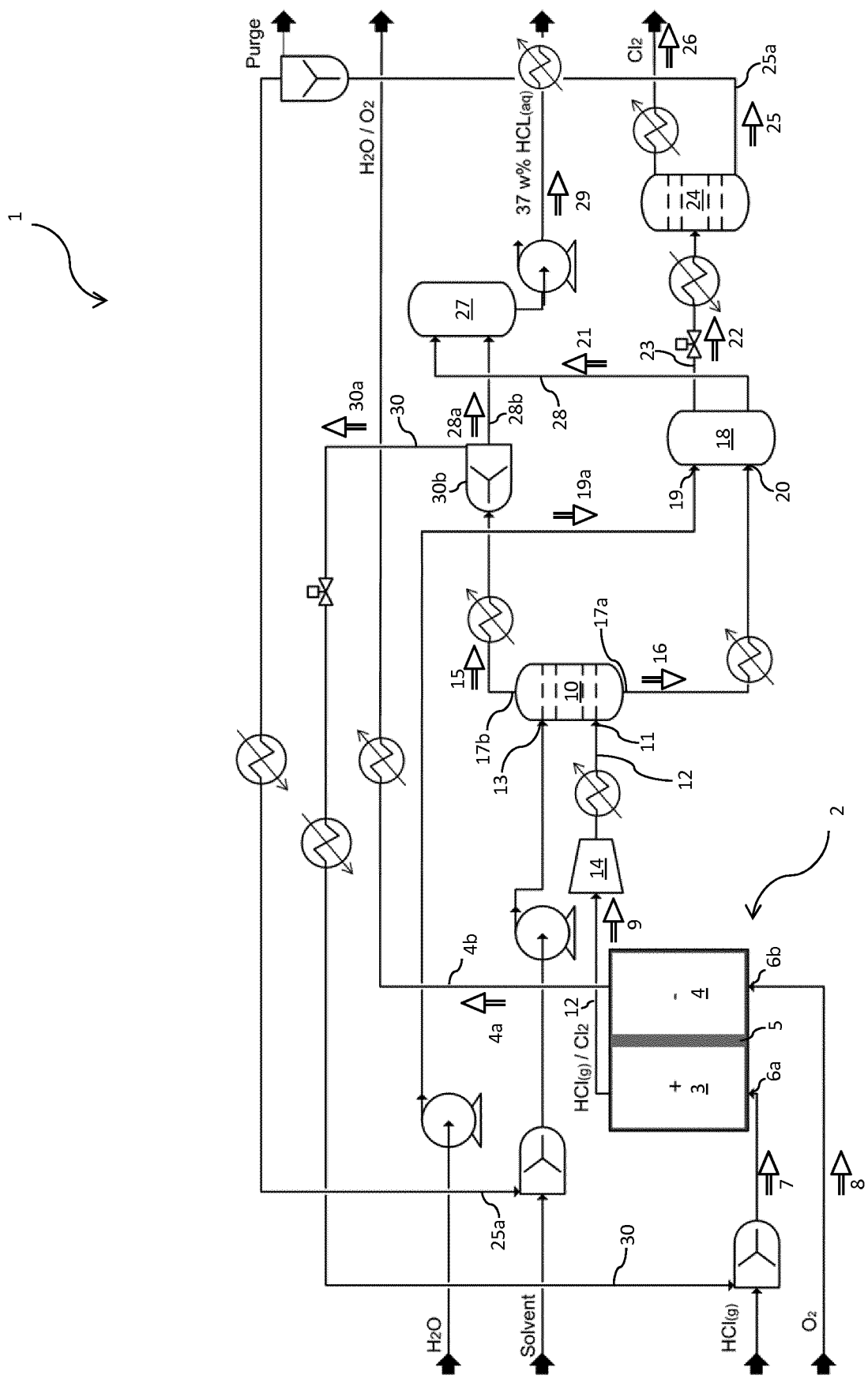
FIG. 1 shows a first example of an embodiment according to the invention.

FIG. 1 shows an apparatus 1 for separating chlorine from a gaseous anode outlet stream mass flow. The apparatus comprises an electrochemical reactor 2. The electrochemical reactor 2 comprises an anode-side half-cell 3 and a cathode-side half-cell 4 being separated by a membrane 5. The membrane 5 is permeable for protons and impermeable for hydrogen chloride and chlorine. Such membranes are known and commercially available, for example under the trade mark NAFION®. The membrane 5 carries out the function of an electrolyte for the transport of protons between the half-cells 3, 4.

The electrochemical cell reactor 2 comprises an anode inlet 6a for introducing a gaseous hydrogen chloride mass flow 7 into the anode-side half-cell 3 and a cathode inlet 6b for introducing a cathode-gas mass flow 8 into the cathode-side half-cell 4. The cathode-gas mass flow 8 may comprise or consist of oxygen. Alternatively, protons are reduced to hydrogen. In the anode-side half-cell 3, the gaseous hydrogen chloride mass flow 7 is oxidized by an electrical power source (not shown), thereby forming chlorine. The chlorine is discharged from the anode-side half-cell 3 together with unconverted fraction of the gaseous hydrogen chloride mass flow and the chlorine forming a gaseous anode outlet stream 9. In the cathode-side half-cell 4 at least a part or all of the oxygen and the protons form water which is discharged in the form of a cathode outlet stream 4a through a cathode outlet stream line 4b. Alternatively, the hydrogen is obtained from reducing the protons at the cathode The apparatus 1 further comprises a first absorber 10 in form of an absorption column 10. The absorption column 10 comprises an inlet 11, the gaseous anode outlet stream 9, being directed through an anode outlet stream line 12, is introduced into the absorber 10 through inlet 11. The absorber 10 also comprises a solvent providing inlet 13.

The gaseous anode outlet stream 9 is compressed by a pressure equipment 14 in the form of a compressor 14 between the outlet of the anode-side half-cell 3 and the inlet 11 of the absorption column 10, by which compressor pressure of the gaseous anode outlet stream mass 7 flow is adjusted for the absorption step.

Due to absorption of chlorine and hydrogen chloride from the anode outlet stream 9 into the solvent being introduced through the solvent providing inlet, inside the column a gas flow 15 of hydrogen chloride and a solution mass flow 16 are formed. The solution mass flow 16 comprises the organic solvent containing, both dissolved, the chlorine and a part of the hydrogen chloride.

The absorber 10 also comprises a first outlet 17a at the bottom of the column for detaching the solution mass flow 16. At the column's head, the absorber 10 comprises a second outlet 17b for detaching the gas flow 15 containing the hydrogen chloride.

The apparatus 1 also comprises a device for extraction 18 in the form of a mixer-settler device. The device for extraction 18 comprises a water mass flow inlet 19 for introduction of a water mass flow 19a into the extraction device 18. Furthermore, the device for extraction 18 comprises a solution mass flow inlet 20 being connected to the first outlet 17a of the column 10 for introducing the solution mass flow 16 into the device for extraction 18. Due to an extraction step, the hydrogen chloride from the solution mass flow 16 is extracted into the water mass flow 19a, thereby forming an aqueous hydrogen chloride mass flow 21 and a purified solution mass flow 22. The purified solution mass flow 22 and the aqueous hydrogen chloride mass flow 21 are discharged from the device for extraction 18.

The detached purified solution mass flow 22 is charged through line 23 to a desorption device 24. Before being introduced into the desorption device 24, a pressure decrease can be applied to the purified solution mass flow 22, e.g. by a throttle. The purified solution mass flow 22 is separated by application of a distillation inside the desorption device 24, thereby forming a liquid organic solvent mass flow 25 and a gaseous chlorine mass flow 26. The organic solvent mass flow 25 is recycled through a recycling line 25a and introduced into the absorption column 10 again through the solvent providing inlet 13.

The apparatus 1 further comprises a second absorber 27 being connected by line 28 with the device for extraction 18, whereby the aqueous hydrogen chloride mass flow 21 is introduced into the second absorber 27. Furthermore, at least a part of the gas flow 15 of hydrogen chloride, being a hydrogen chloride byproduct mass flow 28a, is introduced into the second absorber 27 by a line 28b, thereby augmenting the concentration of the aqueous hydrogen chloride mass flow 21 by an additional absorption of gaseous hydrogen chloride from the hydrogen chloride byproduct mass flow 28a. By these means, a concentrated hydrochloric acid mass flow 29 is obtained as a byproduct.

The gas flow 15 of hydrogen chloride, or respectively its part not being introduced into the second absorber 27, is transported through a recycling line 30 as a recycled hydrogen chloride mass flow 30a from the second outlet 17b to the anode inlet 6a of the anode-side half-cell 3 of the electrochemical reactor 2. Formation of the recycled hydrogen chloride mass flow 30a and of the hydrogen chloride byproduct mass flow 28a is performed by splitting up the gas flow 15 by a splitter 30b.

Figure 2:
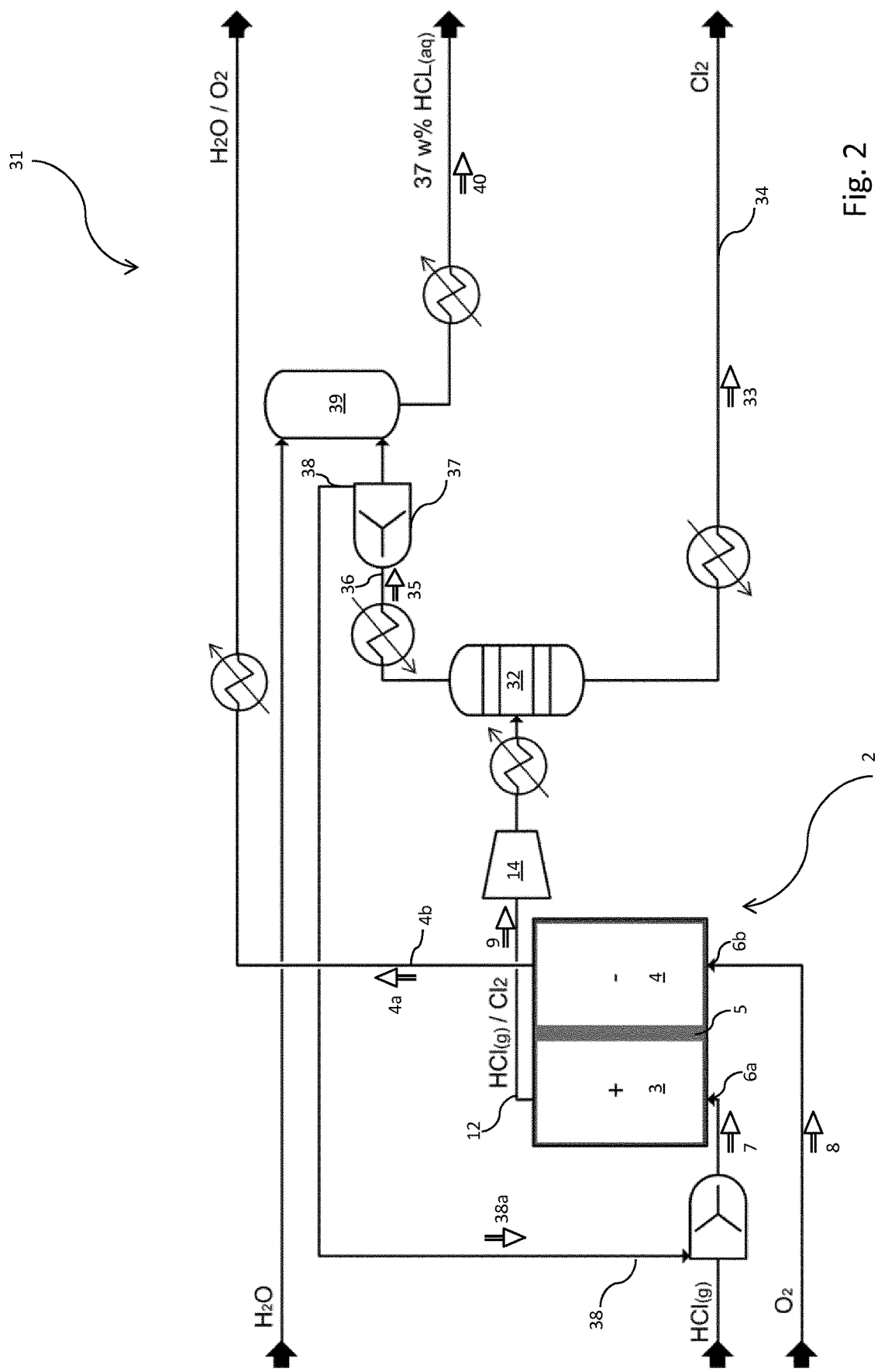
FIG. 2 shows a second example of an embodiment according to the invention.

FIG. 2 shows an apparatus 31 according to the invention. The apparatus 31 comprises an electrochemical reactor 2 according to the apparatus 1 of the first example of an embodiment. As far as the same reference numbers are used, the components referred to in this embodiment are configured in the same way as in the embodiment according to FIG. 1.

The apparatus 31 further comprises a distillation device 32 in the form of a distillation column. In this embodiment, the distillation column 32 is connected to the gaseous anode outlet stream line 12 for introducing the gaseous anode outlet stream 9 into the distillation column. The distillation step being performed in the distillation column 32 is performed at a pressure of at least 1 bar, like at least 2 bar. A pressure increase between the anode-side half-cell 4 and the distillation column 32 is applied by compressing the anode outlet stream 9 in a compressor 14. Thus, the gaseous anode outlet stream 9 is cooled, wherein the chlorine is liquefied and forms a bottom product mass flow 33 which is detached from the bottom of the distillation column 32 by line 34. The not liquefied gaseous hydrogen chloride is detached at the head of the distillation column 32. The hydrogen chloride not being liquefied forms an overhead product mass flow 35 being detached through a line 36.

Line 36 is connected with a splitter 37 allowing for transporting a part or all of the hydrogen chloride of the overhead product mass flow 35 to the anode inlet 6a of the electrochemical reactor 2 through a recycling line 38. By means of the splitter 37, a part or all of the hydrogen chloride can be introduced into an absorber 39, into which absorber also water is introduced for formation of a concentrated hydrochloric acid mass flow 40 as a byproduct.

Figure 3:
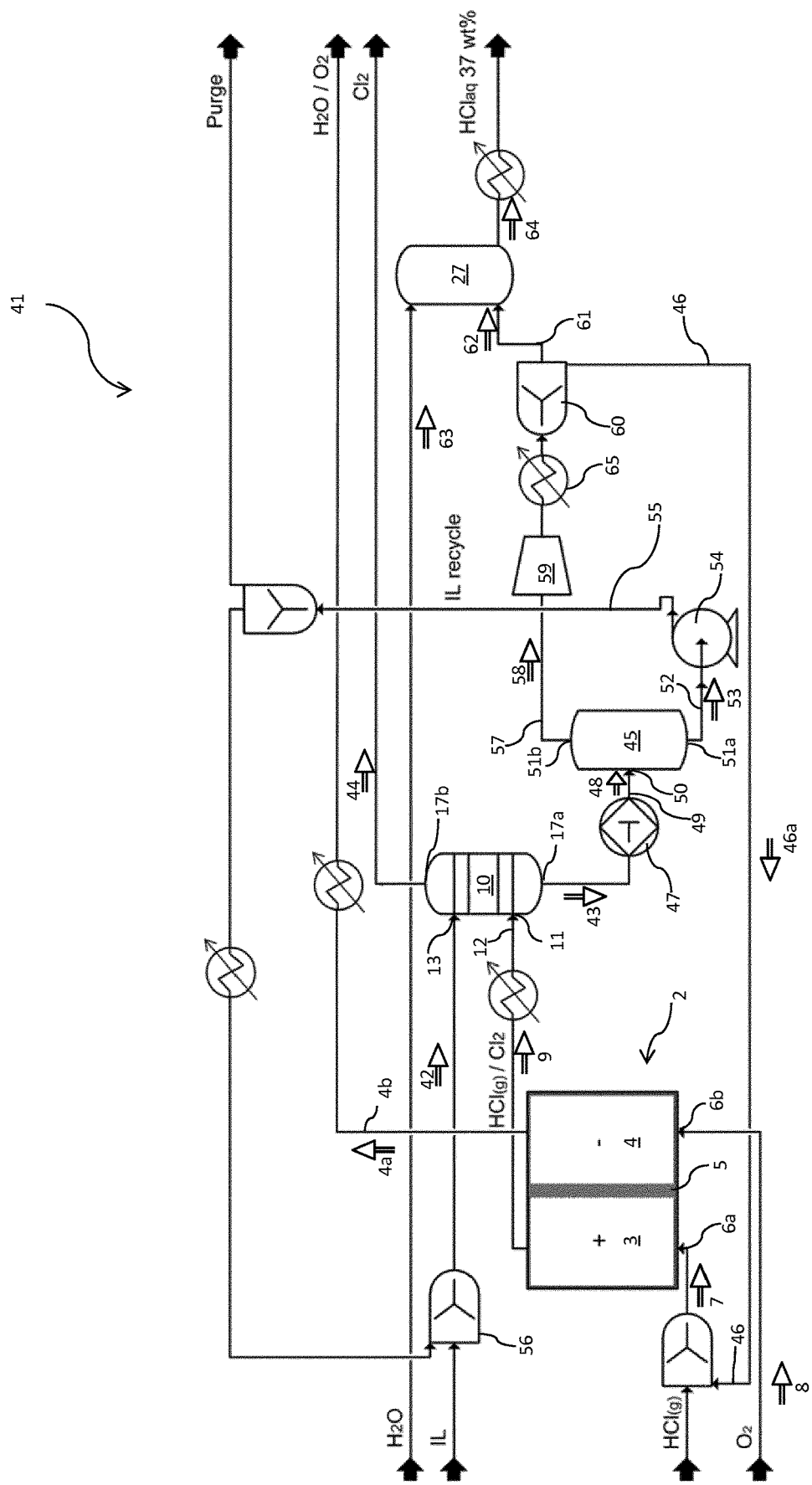
FIG. 3 shows a third example of an embodiment according to the invention.

FIG. 3 shows an apparatus 41 for separating chlorine from a gaseous anode outlet stream mass flow 9. The apparatus 41 comprises an electrochemical reactor 2 according to the apparatuses 1 and 31 of the aforementioned examples of an embodiment. As far as the same reference numbers are used, the components referred to in this embodiment are configured in the same way as in the embodiments according to FIGS. 1 and 2.

According to a further example of an embodiment, a gaseous anode outlet stream 9 is introduced into an absorber 10 through an inlet 11. In this example of an embodiment, an ionic liquid solvent mass flow 42 is introduced into the absorber 10 for absorbing the hydrogen chloride of the gaseous anode outlet stream 9, thus forming a ionic liquid solution mass flow 43 containing essentially all the hydrogen chloride. The ionic liquid solution mass flow 43 is discharged from the absorber 10 by the first outlet 17a. The gaseous chlorine of the gaseous anode outlet stream 9, being non-soluble in the ionic liquid, is detached from the absorber 10 in the form of a purified gas flow 44 at the head of the absorber 10 by the second outlet 17b.

The purified gas flow 44 can be used for chemical synthesis steps as mentioned above.

The ionic liquid solution mass flow 43 comprising the ionic liquid containing the hydrogen chloride is transported to a desorption device 45 for removing the hydrogen chloride from the ionic liquid solution mass flow 43. At least a part of the hydrogen chloride can be recycled by being transported through a recycling line 46 as a recycled hydrogen chloride mass flow 46a and being introduced into the electrochemical cell reactor 2 again.

The desorption step in the desorption device 45 is performed at a lower static pressure than the pressure in the absorber 10. The pressure decrease may be performed by a throttle or by a vacuum pump 47 between the absorber 10 and the desorption device 45. The pressure decreased ionic liquid solution mass flow 48 is introduced through a line 49 into an inlet 50 of the desorption device 45. The desorption device comprises a first outlet 51a and a second outlet 51b.

By heating the pressure decreased ionic liquid solution mass flow 43 inside the desorption device, the hydrogen chloride in the ionic liquid solution mass flow 43 is desorbed and can be discharged from the desorption device 45. The purified ionic liquid mass flow 53 being formed during the desorption step is detached from the desorption device 45 by the first outlet 51a and through a line 52. The pressure of the purified ionic liquid mass flow 53 is increased by a pump 54 and the purified ionic liquid mass flow 53 is recycled through a line 55 for getting introduced into the ionic liquid solvent mass flow 42 by a splitter 56. Thus, a circulation of the ionic liquid is achieved in the apparatus 41.

The hydrogen chloride being desorbed from the pressure decreased ionic liquid solution mass flow 48 is detached from the desorption device 45 through the second outlet 51b and through a line 57 as a gaseous purified hydrogen chloride mass flow 58. The purified hydrogen chloride mass flow 58 is compressed in a compressor 59 and introduced into a splitter 60. From the splitter 60, a part of the purified hydrogen chloride mass flow 58 may be recycled in the form of the recycled hydrogen chloride mass flow 46a through the line 46. Another part of the purified hydrogen chloride mass flow 58 may be transported from the splitter 60 through a line 61, forming a gaseous hydrogen chloride byproduct mass flow 62. The gaseous hydrogen chloride byproduct mass flow 62 is introduced into a second absorber 27 and is exposed to a water mass flow 63. The water mass flow 63 absorbs the gaseous hydrogen chloride byproduct mass flow 62, thereby forming a concentrated hydrochloric acid mass flow 64 as a byproduct.

EXAMPLES OF WORKING CONDITIONS

Given below, for each of the three embodiments according to the FIGS. 1 to 3 one set of working conditions is presented as sets of exemplary data. These data are based on a MDI production plant similar to the production plant of BASF in Antwerp applying a HCL stream of about 0.362 kmol/s.

The following exemplary data were obtained from flowsheet simulations with the program Aspen Plus V. 8.8. In these simulations, the single pass conversion of the electrochemical cell reactor, as well as the overall conversion of hydrogen chloride in the process was set to 80%. Therefore, in these specific examples, no hydrogen chloride recycle towards the electrochemical reactor was employed, but the remaining 20% were dissolved in water forming concentrated hydrochloric acid. The amount of Oxygen fed into the cathode-side half-cell of the electrochemical cell reactor was enough to stoichiometrically convert all the employed hydrogen chloride to chlorine. Since only a hydrogen chloride conversion of 80% is simulated, this means that an oxygen surplus of ca. 10% is employed in these specific examples Hydrogen Chloride Mass Flow 7:

|  |  | in total | $Cl_2$ | HCl | $H_2O$ | $O_2$ |
|---|---|---|---|---|---|---|
| mole flow | [kmol/sec] | 0.36 | 0.00 | 0.36 | 0.00 | 0.00 |
| mass flow | [kg/sec] | 13.20 | 0.00 | 13.20 | 0.00 | 0.00 |
| mole fraction | [—] | 1.0 | 0.00 | 1.00 | 0.00 | 0.00 |
| mass fraction | [—] | 1.0 | 0.00 | 1.00 | 0.00 | 0.00 |
| temperature | [K] | 298.15 | | | | |
| Pressure | [Pa] | $1.01 \cdot 10^5$ | | | | |

Cathode Gas Mass Flow 8:

|  |  | in total | $Cl_2$ | HCl | $H_2O$ | $O_2$ |
|---|---|---|---|---|---|---|
| mole flow | [kmol/sec] | $9 \cdot 10^{-2}$ | 0.00 | 0.00 | 0.00 | $9 \cdot 10^{-2}$ |
| mass flow | [kg/sec] | 2.88 | 0.00 | 0.00 | 0.00 | 2.88 |
| mole fraction | [—] | 1.0 | 0.00 | 0.00 | 0.00 | 1.00 |
| mass fraction | [—] | 1.0 | 0.00 | 0.00 | 0.00 | 1.00 |
| temperature | [K] | 298.15 | | | | |
| Pressure | [Pa] | $1.01 \cdot 10^5$ | | | | |

Gaseous Anode Outlet Stream 9:

|  |  | in total | $Cl_2$ | HCl | $H_2O$ | $O_2$ |
|---|---|---|---|---|---|---|
| mole flow | [kmol/sec] | 0.22 | 0.15 | 0.07 | 0.00 | 0.00 |
| mass flow | [kg/sec] | 12.91 | 10.27 | 2.64 | 0.00 | 0.00 |
| mole fraction | [—] | 1.00 | 0.67 | 0.33 | 0.00 | 0.00 |
| mass fraction | [—] | 1.00 | 10.27 | 2.64 | 0.00 | 0.00 |
| temperature | [K] | 313.15 | | | | |
| Pressure | [Pa] | $1.01 \cdot 10^5$ | | | | |

Cathode Outlet Stream 4a

|  |  | in total | $Cl_2$ | HCl | $H_2O$ | $O_2$ |
|---|---|---|---|---|---|---|
| mole flow | [kmol/sec] | 0.16 | 0.00 | 0.00 | 0.14 | 0.02 |
| mass flow | [kg/sec] | 3.17 | 0.00 | 0.00 | 2.61 | 0.56 |
| mole fraction | [—] | 1.00 | 0.00 | 0.00 | 0.89 | 0.11 |
| mass fraction | [—] | 1.00 | 0.00 | 0.00 | 0.82 | 0.18 |
| temperature | [K] | 313.15 | | | | |
| Pressure | [Pa] | $1.01 \cdot 10^5$ | | | | |

In the following examples, the hydrogen chloride mass flow 7, the cathode gas mass flow 8, the gaseous anode outlet stream 9 and the cathode outlet stream 4a have the same properties.

The exergy consumption of the electrochemical reactor in each example is about 25.04 MW.

Example 1

For the present example of the process involving an absorption step with an organic solvent, n-octane was chosen as organic solvent. The example relates to a setup according to FIG. 1. The streams according to the process flow chart in FIG. 1 are as follows using 02 as cathode inlet gas:

Gas Flow 15:

|  |  | in total | $Cl_2$ | HCl | $H_2O$ | $O_2$ | n-octane |
|---|---|---|---|---|---|---|---|
| mole flow | [kmol/sec] | $3.46 \cdot 10^{-2}$ | $4.54 \cdot 10^{-6}$ | $3.45 \cdot 10^{-2}$ | $2.36 \cdot 10^{-6}$ | 0.00 | $9.04 \cdot 10^{-5}$ |
| mass flow | [kg/sec] | 1.27 | $3.22 \cdot 10^{-2}$ | 1.26 | $4.25 \cdot 10^{-5}$ | 0.00 | $1.03 \cdot 10^{-2}$ |
| mole fraction | [—] | 1.00 | $1.31 \cdot 10^{-4}$ | 0.10 | $6.82 \cdot 10^{-5}$ | 0.00 | $2.61 \cdot 10^{-3}$ |
| mass fraction | [—] | 1.00 | $2.54 \cdot 10^{-4}$ | 0.99 | $3.35 \cdot 10^{-5}$ | 0.00 | $8.14 \cdot 10^{-3}$ |
| temperature | [K] | 298.2938 | | | | | |
| Pressure | [Pa] | $8.11 \cdot 10^5$ | | | | | |

Solution Mass Flow 16:

|  |  | in total | $Cl_2$ | HCl | $H_2O$ | $O_2$ | n-octane |
|---|---|---|---|---|---|---|---|
| mole flow | [kmol/sec] | 0.45 | 0.14 | $3.79 \cdot 10^{-2}$ | $1.08 \cdot 10^{-4}$ | 0.00 | 0.27 |
| mass flow | [kg/sec] | 42.48 | 10.27 | 1.38 | $1.94 \cdot 10^{-3}$ | 0.00 | 30.83 |
| mole fraction | [—] | 1.00 | 0.32 | $8.37 \cdot 10^{-2}$ | $2.38 \cdot 10^{-4}$ | 0.00 | 0.60 |
| mass fraction | [—] | 1.00 | 0.24 | $3.25 \cdot 10^{-2}$ | $4.57 \cdot 10^{-5}$ | 0.00 | 0.73 |
| temperature | [K] | 331.54 | | | | | |
| Pressure | [Pa] | $8.11 \cdot 10^5$ | | | | | |

Water Mass Flow 19*a*:

|  |  | in total | $Cl_2$ | HCl | $H_2O$ | $O_2$ | n-octane |
|---|---|---|---|---|---|---|---|
| mole flow | [kmol/sec] | 0.25 | 0.00 | 0.00 | 0.25 | 0.00 | 0.00 |
| mass flow | [kg/sec] | 4.50 | 0.00 | 0.00 | 4.50 | 0.00 | 0.00 |
| mole fraction | [—] | 1.00 | 0.00 | 0.00 | 1.00 | 0.00 | 0.00 |
| mass fraction | [—] | 1.00 | 0.00 | 0.00 | 1.00 | 0.00 | 0.00 |
| temperature | [K] | 298.34 |  |  |  |  |  |
| Pressure | [Pa] | $8.11 \cdot 10^5$ |  |  |  |  |  |

Aqueous Hydrogen Chloride Mass Flow 21:

|  |  | in total | $Cl_2$ | HCl | $H_2O$ | $O_2$ | n-octane |
|---|---|---|---|---|---|---|---|
| mole flow | [kmol/sec] | 0.288 | $8.73 \cdot 10^{-4}$ | $3.79 \cdot 10^{-2}$ | 0.25 | 0.00 | $2.48 \cdot 10^{-8}$ |
| mass flow | [kg/sec] | 5.83 |  |  |  |  |  |
| mole fraction | [—] | 1.00 |  |  |  |  |  |
| mass fraction | [—] | 1.00 |  |  |  |  |  |
| temperature | [K] | 308.15 |  |  |  |  |  |
| Pressure | [Pa] | $8.11 \cdot 10^5$ |  |  |  |  |  |

Purified Solution Mass Flow 22:

|  |  | in total | $Cl_2$ | HCl | $H_2O$ | $O_2$ | n-octane |
|---|---|---|---|---|---|---|---|
| mole flow | [kmol/sec] | 0.41 | 0.14 | 0.00 | $1.35 \cdot 10^{-4}$ | 0.00 | 0.27 |
| mass flow | [kg/sec] | 41.05 | 10.21 | 0.00 | $2.43 \cdot 10^{-3}$ | 0.00 | 30.84 |
| mole fraction | [—] | 1.00 | 0.35 | 0.00 | $3.26 \cdot 10^{-4}$ | 0.00 | 0.65 |
| mass fraction | [—] | 1.00 | 0.25 | 0.00 | $5.93 \cdot 10^{-5}$ | 0.00 | 0.75 |
| temperature | [K] | 300.00 |  |  |  |  |  |
| Pressure | [Pa] | $8.11 \cdot 10^5$ |  |  |  |  |  |

Chlorine Mass Flow 26:

|  |  | in total | $Cl_2$ | HCl | $H_2O$ | $O_2$ | n-octane |
|---|---|---|---|---|---|---|---|
| mole flow | [kmol/sec] | 0.14 | 0.14 | 0.00 | $2.48 \cdot 10^{-5}$ | 0.00 | $7.72 \cdot 10^{-7}$ |
| mass flow | [kg/sec] | 10.21 | 10.21 | 0.00 | $4.46 \cdot 10^{-4}$ | 0.00 | $8.81 \cdot 10^{-5}$ |
| mole fraction | [—] | 1.00 | 0.10 | 0.00 | $1.72 \cdot 10^{-4}$ | 0.00 | $5.36 \cdot 10^{-6}$ |
| mass fraction | [—] | 1.00 | 0.10 | 0.00 | $4.37 \cdot 10^{-5}$ | 0.00 | $8.64 \cdot 10^{-6}$ |
| temperature | [K] | 244.09 |  |  |  |  |  |
| Pressure | [Pa] | $1.01 \cdot 10^5$ |  |  |  |  |  |

Organic Solvent Mass Flow 25:

|  |  | in total | $Cl_2$ | HCl | $H_2O$ | $O_2$ | n-octane |
|---|---|---|---|---|---|---|---|
| mole flow | [kmol/sec] | 0.27 | $3.79 \cdot 10^{-5}$ | 0.00 | $1.10 \cdot 10^{-4}$ | 0.00 | 0.27 |
| mass flow | [kg/sec] | 30.85 | $2.69 \cdot 10^{-3}$ | 0.00 | $1.99 \cdot 10^{-3}$ | 0.00 | 30.84 |
| mole fraction | [—] | 1.00 | $1.40 \cdot 10^{-4}$ | 0.00 | $4.08 \cdot 10^{-4}$ | 0.00 | 0.10 |
| mass fraction | [—] | 1.00 | $8.72 \cdot 10^{-5}$ | 0.00 | $6.44 \cdot 10^{-5}$ | 0.00 | 0.10 |
| temperature | [K] | 395.03 |  |  |  |  |  |
| Pressure | [Pa] | $1.01 \cdot 10^5$ |  |  |  |  |  |

Concentrated Aqueous Hydrogen Chloride Mass Flow 29:

|  |  | in total | $Cl_2$ | HCl | $H_2O$ | $H_3O^+$ | $Cl^-$ |
|---|---|---|---|---|---|---|---|
| mole flow | [kmol/sec] | 0.32 | $4.64 \cdot 10^{-5}$ | $5.35 \cdot 10^{-10}$ | 0.18 | $7.24 \cdot 10^{-2}$ | $7.24 \cdot 10^{-2}$ |
| mass flow | [kg/sec] | 7.14 | $3.29 \cdot 10^{-3}$ | $1.95 \cdot 10^{-8}$ | 3.19 | 1.38 | 2.57 |
| mole fraction | [—] | 1.00 | $1.44 \cdot 10^{-4}$ | $1.66 \cdot 10^{-9}$ | 0.55 | 0.22 | 0.22 |

-continued

|  |  | in total | $Cl_2$ | HCl | $H_2O$ | $H_3O^+$ | $Cl^-$ |
|---|---|---|---|---|---|---|---|
| mass fraction | [—] | 1.00 | $4.60 \cdot 10^{-4}$ | $2.73 \cdot 10^{-9}$ | 0.45 | 0.19 | 0.36 |
| temperature | [K] | 307.10 | | | | | |
| Pressure | [Pa] | $1.01 \cdot 10^5$ | | | | | |

In this example, the absorber 10 is an absorption column with 16 stages (or an equivalent height in the case of a packing column). The absorption step is carried out at 8.10 bar and with a top stage temperature of 298.3 K and a bottom stage temperature of 331.50 K.

The extraction step in the extraction device 18 is carried out with a temperature of the water and hydrogen chloride phase of 308.15 K and a temperature of the octane phase of 300 K.

The desorption step is carried out in the desorption device 24 with a condenser temperature of 244 K and a sump temperature of 395 K.

Absorption of hydrogen chloride in the second absorber 27 is carried out with a temperature of 308.15 K.

In this embodiment, the exergy consumption of the method for separating the chlorine and the production of the hydrochloric acid is about 2 MW.

The exergy consumption of the overall process is about 27.04 MW which is about 36% lower than the exergy consumption of about 42.27 MW of the Bayer UHDENORA process as described in U.S. Pat. No. 8,153,938 B2 and based on the public data sheets by Thyssen, e.g. as published in "Hydrochloric acid electrolysis sustainable chlorine production", ThyssenKrupp Uhde GmbH, 2012.

Example 2

For the present example of the process involving an absorption step with an ionic liquid, diethyl-methylsulfonium methanesulfonate ([S221][MeSO3]) was chosen as ionic liquid. The example relates to a setup according to FIG. 3. The most important streams according to the process flow chart in FIG. 3 are as follows:

Ionic Liquid Solvent Mass Flow 42:

|  |  | in total | $Cl_2$ | HCl | Ionic liquid |
|---|---|---|---|---|---|
| mole flow | [kmol/sec] | $5.79 \cdot 10^{-3}$ | $5.75 \cdot 10^{-9}$ | $7.87 \cdot 10^{-4}$ | $5.01 \cdot 10^{-3}$ |
| mass flow | [kg/sec] | 1.04 | $9.93 \cdot 10^{-7}$ | 0.14 | 0.86 |
| temperature | [K] | 298.15 | | | |
| Pressure | [Pa] | $1.01 \cdot 10^5$ | | | |

Ionic Liquid Solution Mass Flow 43:

|  |  | in total | $Cl_2$ | HCl | Ionic liquid |
|---|---|---|---|---|---|
| mole flow | [kmol/sec] | $7.92 \cdot 10^{-2}$ | $1.63 \cdot 10^{-3}$ | $7.25 \cdot 10^{-2}$ | $5.01 \cdot 10^{-3}$ |
| mass flow | [kg/sec] | 3.77 | | | |
| mole fraction | [—] | 1.00 | $2.06 \cdot 10^{-2}$ | 0.92 | $6.32 \cdot 10^{-2}$ |
| temperature | [K] | 298.15 | | | |
| Pressure | [Pa] | $1.01 \cdot 10^5$ | | | |

Purified Gas Flow 44:

|  |  | in total | $Cl_2$ | HCl | Ionic liquid |
|---|---|---|---|---|---|
| mole flow | [kmol/sec] | 0.14 | 0.14 | $6.53 \cdot 10^{-4}$ | 0.00 |
| mass flow | [kg/sec] | 10.18 | | | |
| mole fraction | [—] | 1.00 | 1.00 | $4.54 \cdot 10^{-3}$ | 0.00 |
| temperature | [K] | 298.15 | | | |
| Pressure | [Pa] | $1.01 \cdot 10^5$ | | | |

Pressure Decreased Ionic Liquid Solution Mass Flow 48:

|  |  | in total | $Cl_2$ | HCl | Ionic liquid |
|---|---|---|---|---|---|
| mole flow | [kmol/sec] | $7.92 \cdot 10^{-2}$ | $1.63 \cdot 10^{-3}$ | $7.25 \cdot 10^{-2}$ | $5.01 \cdot 10^{-3}$ |
| mass flow | [kg/sec] | 3.77 | | | |
| mole fraction | [—] | 1.00 | $2.06 \cdot 10^{-2}$ | 0.92 | $6.32 \cdot 10^{-2}$ |
| temperature | [K] | 298.15 | | | |
| Pressure | [Pa] | 5066.25 | | | |

Purified Ionic Liquid Mass Flow 53:

|  |  | in total | $Cl_2$ | HCl | Ionic liquid |
|---|---|---|---|---|---|
| mole flow | [kmol/sec] | $5.79 \cdot 10^{-3}$ | $5.76 \cdot 10^{-3}$ | $7.87 \cdot 10^{-4}$ | $5.01 \cdot 10^{-3}$ |
| mass flow | [kg/sec] | 1.04 | | | |
| mole fraction | [—] | 1.00 | $9.93 \cdot 10^{-7}$ | 0.14 | 0.86 |
| temperature | [K] | 483.15 | | | |
| Pressure | [Pa] | 5066.25 | | | |

Purified Hydrogen Chloride Mass Flow 58:

|  |  | in total | $Cl_2$ | HCl | Ionic liquid |
|---|---|---|---|---|---|
| mole flow | [kmol/sec] | $7.34 \cdot 10^{-2}$ | $1.63 \cdot 10^{-3}$ | $7.17 \cdot 10^{-2}$ | $2.38 \cdot 10^{-22}$ |
| mass flow | [kg/sec] | 2.73 | | | |
| mole fraction | [—] | 1.00 | $2.23 \cdot 10^{-2}$ | 0.98 | $3.24 \cdot 10^{-21}$ |
| temperature | [K] | 483.15 | | | |
| Pressure | [Pa] | 5066.25 | | | |

Gaseous Hydrogen Chloride Byproduct Mass Flow 62:

|  |  | in total | $Cl_2$ | HCl | Ionic liquid |
|---|---|---|---|---|---|
| mole flow | [kmol/sec] | $7.34 \cdot 10^{-2}$ | $1.63 \cdot 10^{-3}$ | $7.17 \cdot 10^{-2}$ | $2.38 \cdot 10^{-22}$ |
| mass flow | [kg/sec] | 2.73 | | | |
| mole fraction | [—] | 1.00 | $2.23 \cdot 10^{-22}$ | 0.98 | $3.24 \cdot 10^{-21}$ |
| temperature | [K] | 298.15 | | | |
| Pressure | [Pa] | $1.01 \cdot 10^5$ | | | |

Since no recycled hydrogen chloride mass flow 46a is provided, the composition of the gaseous hydrogen chloride byproduct mass flow 62 corresponds to the composition of the purified hydrogen chloride mass flow 58 but may have a higher temperature and a higher pressure due to compression by the compressor 59 and eventually additional heating by a heat exchanger 65.

Water Mass Flow 63:

|  |  | in total | $Cl_2$ | HCl | Ionic liquid | $H_2O$ |
|---|---|---|---|---|---|---|
| mole flow | [kmol/sec] | 0.25 | 0.00 | 0.00 | 0.00 | 0.25 |
| mass flow | [kg/sec] | 4.44 | 0.00 | 0.00 | 0.00 | 4.44 |
| mole fraction | [—] | 1.00 | 0.00 | 0.00 | 0.00 | 1.00 |
| temperature | [K] | 298.15 | | | | |
| Pressure | [Pa] | $1.01 \cdot 10^5$ | | | | |

Hydrogen Chloride Mass Flow 64:

|  |  | in total | $Cl_2$ | HCl | $H_2O$ | $H_3O^+$ | $Cl^-$ |
|---|---|---|---|---|---|---|---|
| mole flow | [kmol/sec] | 0.32 | 0.00 | $5.38 \cdot 10^{-10}$ | 0.17 | $7.17 \cdot 10^{-2}$ | $7.17 \cdot 10^{-2}$ |
| mass flow | [kg/sec] | 7.05 | 0.00 | $1.96 \cdot 10^{-8}$ | 3.14 | 1.36 | 2.54 |
| mole fraction | [—] | 1.00 | 0.00 | $1.69 \cdot 10^{-9}$ | 0.55 | 0.23 | 0.23 |
| mass fraction | [—] | 1.00 | 0.00 | $2.78 \cdot 10^{-9}$ | 0.45 | 0.19 | 0.36 |
| temperature | [K] | 308.15 | | | | | |
| Pressure | [Pa] | $1.01 \cdot 10^5$ | | | | | |

In this example, the absorption step is carried out at a temperature of 298.15 K in a single stage absorber. The vacuum pump 47 and/or a throttle valve in combination with the compressor 59 does provide a vacuum with a pressure of 0.05 bar at its outlet.

The compressor 54 provides a pressure of 1.013 bar for recycling the ionic liquid through line 55 and into the splitter 56.

The compressor 59 provides a four-stage compression of the purified hydrogen chloride mass flow 58, i.e. from 0.05 bar to 0.1 bar by the first compression stage, from 0.1 to 0.2 bar by the second compression stage, from 0.2 to 0.4 bar by the third compression stage and from 0.4 to 1.013 bar by the fourth compression stage. After being compressed to a pressure of 1.013 bar or 1 atm, the compressed purified hydrogen chloride mass flow 58 is cooled by the heat exchanger 65 before being introduced into the second absorber 27.

In the second absorber 27, absorption of hydrogen chloride is carried out at a temperature of 308.15 K and at a pressure of 1.013 bar.

In this embodiment, the exergy consumption of the method for separating the chlorine and the production of the hydrochloric acid is about 1.96 MW.

The exergy consumption of the overall process is about 27.00 MW which is about 36% lower than the exergy consumption of about 42.25 MW of the Bayer UHDENORA process.

Example 3

The example relates to a setup according to FIG. 2. For the process involving a distillation step, the distillation was carried out at 1 atmospheric pressure. The most important streams according to the process flow chart in FIG. 2 are as follows:

Bottom product mass flow 33 being discharged from distillation column 32:

|  |  | in total | $Cl_2$ | HCl | $H_2O$ | $O_2$ |
|---|---|---|---|---|---|---|
| mole flow | [kmol/sec] | 0.14 | 0.14 | $5.04 \cdot 10^{-5}$ | 0.00 | 0.00 |
| mass flow | [kg/sec] | 10.27 | 10.26 | $1.84 \cdot 10^{-3}$ | 0.00 | 0.00 |
| mole fraction | [—] | 1.00 | 0.10 | $3.48 \cdot 10^{-4}$ | 0.00 | 0.00 |
| mass fraction | [—] | 1.00 |  |  |  |  |
| temperature | [K] | 298.15 |  |  |  |  |
| Pressure | [Pa] | $1.01 \cdot 10^5$ |  |  |  |  |

Overhead Product Mass Flow 35 being Discharged from Distillation Column 32:

|  |  | in total | $Cl_2$ | HCl | $H_2O$ | $O_2$ |
|---|---|---|---|---|---|---|
| mole flow | [kmol/sec] | $7.24 \cdot 10^{-2}$ | $4.31 \cdot 10^{-5}$ | $7.24 \cdot 10^{-2}$ | 0.00 | 0.00 |
| mass flow | [kg/sec] | 2.64 | $3.06 \cdot 10^{-3}$ | 2.64 | 0.00 | 0.00 |
| mole fraction | [—] | 1.00 | $5.96 \cdot 10^{-4}$ | 0.10 | 0.00 | 0.00 |
| mass fraction | [—] | 1.00 | $1.16 \cdot 10^{-3}$ | 0.10 | 0.00 | 0.00 |
| temperature | [K] | 298.15 |  |  |  |  |
| Pressure | [Pa] | $1.01 \cdot 10^5$ |  |  |  |  |

Concentrated Aqueous Hydrogen Chloride Mass Flow 40 being Discharged from Distillation Column 32:

|  |  | in total | $Cl_2$ | HCl | $H_2O$ | $H_3O^+$ | $Cl^-$ |
|---|---|---|---|---|---|---|---|
| mole flow | [kmol/sec] | 0.32 | $4.31 \cdot 10^{-5}$ | $7.05 \cdot 10^{-10}$ | 0.18 | $7.24 \cdot 10^{-2}$ | $7.24 \cdot 10^{-2}$ |
| mass flow | [kg/sec] | 7.11 | $3.06 \cdot 10^{-3}$ | $2.57 \cdot 10^{-8}$ | 3.17 | 1.38 | 2.57 |
| mole fraction | [—] | 1.00 | $1.35 \cdot 10^{-4}$ | $2.20 \cdot 10^{-9}$ | 0.55 | 0.23 | 0.23 |
| mass fraction | [—] | 1.00 | $4.30 \cdot 10^{-4}$ | $3.62 \cdot 10^{-9}$ | 0.45 | 0.19 | 0.36 |
| temperature | [K] | 298.15 |  |  |  |  |  |
| Pressure | [Pa] | $1.01 \cdot 10^5$ |  |  |  |  |  |

In this example, the distillation device 32 is a distillation column with 16 stages (or in the case of a packed column with a height being equivalent to 16 stages). The distillation column 32 is operated with a condenser temperature of 187.3 K at the column's head and with a sump temperature of 239.4 K at the bottom of the column.

In this embodiment, the exergy consumption of the method for separating the chlorine and the production of the hydrochloric acid is about 1.22 MW.

The exergy consumption of the overall process is about 26.26 MW which is about 38% lower than the exergy consumption of about 42.25 MW of the Bayer UHDENORA process

REFERENCES 1 apparatus
2 electrochemical reactor
3 anode-side half-cell
4 cathode-side half-cell
4a cathode outlet stream
4b cathode outlet stream line
5 membrane
6a anode inlet
6b cathode inlet
7 gaseous hydrogen chloride mass flow
8 cathode gas mass flow
9 gaseous anode outlet stream
10 absorber
11 inlet
12 anode outlet stream line
13 solvent providing inlet
14 compressor
15 gas flow
16 solution mass flow
17a first outlet
17b second outlet
18 device for extraction
19 water mass flow inlet
20 solution mass flow inlet
21 aqueous hydrogen chloride mass flow
22 purified solution mass flow
23 line
24 desorption device
25 organic solvent mass flow
25a recycling line
26 chlorine mass flow
27 second absorber
28 line
28a hydrogen chloride byproduct mass flow
28b line
29 concentrated aqueous hydrogen chloride mass flow
30 recycling line
30a recycled hydrogen chloride mass flow
30b splitter
31 apparatus
32 distillation device
33 bottom product mass flow
34 line
35 overhead product mass flow
36 line
37 splitter
38 recycling line
39 absorber
40 concentrated aqueous hydrogen chloride mass flow
41 apparatus
42 ionic liquid solvent mass flow
43 ionic liquid solution mass flow
44 gas flow
45 desorption device
46 recycling line
46a recycled hydrogen chloride mass flow
47 vacuum pump
48 pressure decreased ionic liquid solution mass flow
49 line
50 inlet
51a first outlet
51b second outlet
52 line
53 purified ionic liquid mass flow
54 pump
55 line
56 splitter
57 line
58 purified hydrogen chloride mass flow
59 compressor
60 splitter
61 line
62 hydrogen chloride byproduct mass flow
63 water mass flow
64 concentrated hydrochloric acid mass flow
65 heat exchanger

The invention claimed is:

1. A method for separating chlorine from a gaseous anode outlet stream mass flow of an electrochemical cell reactor, said anode outlet stream mass flow essentially comprising chlorine and anhydrous hydrogen chloride, comprising the following steps:
 a) an absorption step, wherein the anode outlet stream mass flow is exposed to an organic solvent, thereby forming
  a solution mass flow comprising the organic solvent containing the chlorine and a part of the hydrogen chloride, the chlorine and the part of hydrogen chloride being both dissolved in said organic solvent and
  a gas flow containing essentially hydrogen chloride,
 b) an extraction step, wherein the solution mass flow obtained in a) is exposed to a water mass flow, thereby forming
  an aqueous hydrogen chloride mass flow comprising essentially the water mass flow and hydrogen chloride extracted from said solution and
  a purified solution mass flow composed of the organic solvent and the chlorine,
 c) a desorption step, wherein the chlorine is desorbed from the purified solution mass flow obtained in b), whereby said organic solvent is essentially immiscible with water.

2. The method for separating chlorine from a gaseous anode outlet stream mass flow according to claim 1 wherein the organic solvent is a non-polar organic solvent.

3. The method for separating chlorine from a gaseous anode outlet stream mass flow according to claim 1 whereby the separated hydrogen chloride is at least partly recycled to the inlet of the anode of the electrochemical cell reactor.

4. The method for separating chlorine from a gaseous anode outlet stream mass flow according to claim 1 whereby the separated hydrogen chloride is at least partly converted into a concentrated hydrochloric acid.

5. The method for separating chlorine from a gaseous anode outlet stream mass flow according to claim 1, wherein the desorption step c) is a distillation step.

6. The method for separating chlorine from a gaseous anode outlet stream mass flow according to claim 1 wherein said outlet stream contains chlorine according to a conversion rate of hydrogen chloride to chlorine ranging from 50% to 80%.

7. The method for separating chlorine from a gaseous anode outlet stream mass flow according to claim 1 wherein the purity of the separated chlorine is at least 98%.

8. A method for separating chlorine from a gaseous anode outlet stream mass flow of an electrochemical cell reactor, said anode outlet stream mass flow essentially comprising chlorine and anhydrous hydrogen chloride, comprising the following steps:
 a) an absorption step wherein the anode outlet stream mass flow is exposed to an ionic liquid, thereby forming a solution mass flow comprising the ionic liquid containing the hydrogen chloride dissolved in said ionic liquid, and a gas flow containing essentially chlorine, and
 b) a desorption step wherein the hydrogen chloride is desorbed from the solution mass flow obtained by reduction of pressure and/or raising the temperature, thus, obtaining gaseous hydrogen chloride.

9. The method for separating chlorine from a gaseous anode outlet stream mass flow according to claim 8 whereby the separated hydrogen chloride is at least partly recycled to the inlet of the anode of the electrochemical cell reactor.

10. The method for separating chlorine from a gaseous anode outlet stream mass flow according to claim 8 whereby the separated hydrogen chloride is at least partly converted into a concentrated hydrochloric acid.

11. The method for separating chlorine from a gaseous anode outlet stream mass flow according to claim 8 wherein the purity of the separated chlorine is at least 98%.

12. The method for separating chlorine from a gaseous anode outlet stream mass flow according to claim 8 wherein said outlet stream contains chlorine according to a conversion rate of hydrogen chloride to chlorine ranging from 50% to 80%.

13. A method for separating chlorine from a gaseous anode outlet stream mass flow of an electrochemical cell reactor, said anode outlet stream mass flow essentially comprising chlorine and anhydrous hydrogen chloride, said method comprising a distillation step, wherein the anode outlet stream mass flow is separated at a static pressure of at least 2 bar, thereby forming an overhead product mass flow comprising the gaseous hydrogen chloride and a bottom product mass flow comprising the chlorine, whereby the separated hydrogen chloride is at least partially recycled to the inlet of the anode of the electrochemical all reactor and wherein the condenser temperature in the distillation column used in the distillation step is above 195 K, and whereby the separated hydrogen chloride is at least partly converted into a concentrated hydrochloric acid.

14. The method for separating chlorine from a gaseous anode outlet stream mass flow according to claim 13 wherein the static pressure is at least 4 bar.

15. The method for separating chlorine from a gaseous anode outlet stream mass flow according to claim 13 wherein said outlet stream contains chlorine according to a conversion rate of hydrogen chloride to chlorine ranges from 50% to 80%.

16. The method for separating chlorine from a gaseous anode outlet stream mass flow according to claim 13 wherein the purity of the separated chlorine is at least 98%.

17. An apparatus for separating chlorine from a gaseous anode outlet stream mass flow comprising
 an electrochemical reactor having an anode outlet of a gaseous anode outlet stream comprising chlorine and hydrogen chloride, a cathode outlet stream, an anode inlet and a cathode inlet;
 a first absorber connected with the outlet of a gaseous anode outlet stream by a gaseous anode outlet stream line allowing absorption of chlorine in a non-polar organic solvent introduced into the absorber by a solvent providing inlet, the absorber has an inlet for introducing the gaseous anode outlet stream into the absorber and a first outlet for a non-polar organic solvent containing essentially chlorine and a part of hydrogen chloride an a second outlet for essentially the gaseous hydrogen chloride;
 a device for extraction of the non-polar organic solvent containing essentially chlorine and a part of hydrogen chloride into i) an aqueous hydrogen chloride mass flow and ii) a purified, solvent mass flow containing chlorine;
 a desorption device for separating the chlorine from the non-polar organic solvent present in the purified solvent mass flow;
 optionally a second absorber connected by a line with the first absorber and/or the device for extraction for absorbing at least part of hydrogen chloride obtaining concentrated aqueous hydrogen chloride;
 optionally a recycling line for the transport of hydrogen chloride from the first absorber to the anode inlet of the electrochemical reactor,
 adapted for conducting a method according to claim 1.

18. The apparatus according to claim 17 further comprising a pressure equipment for applying pressure or vacuum in the distillation device or the absorber.

19. An apparatus for separating chlorine from a gaseous anode outlet stream mass flow comprising
 an electrochemical reactor having an anode outlet of a gaseous anode outlet stream comprising chlorine and hydrogen chloride, a cathode outlet stream, an anode inlet and a cathode inlet;
 a distillation device connected with the outlet of a gaseous anode outlet stream by a gaseous anode outlet stream line allowing distillation of the gaseous anode outlet stream into an overhead product mass flow essentially comprising gaseous hydrogen chloride and a bottom product mass flow essentially comprising chlorine;
 an absorber connected by a line with the head of the distillation device for absorbing at least part of hydrogen chloride present in the overhead product mass flow obtaining concentrated aqueous hydrogen chloride;
 a recycling line for the transport of hydrogen chloride to the anode inlet of the electrochemical reactor, and a pressure equipment for applying pressure or vacuum in the distillation device adapted for conducting a method according to claim 13.

20. The apparatus according to claim 19 further comprising a pressure equipment for applying pressure or vacuum in the distillation device or the absorber.

21. Apparatus for separating chlorine from a gaseous anode outlet stream mass flow comprising
 an electrochemical reactor having an anode outlet of a gaseous anode outlet stream essentially comprising chlorine and hydrogen chloride, a cathode outlet stream, an anode inlet and a cathode inlet;
 a first absorber connected with the outlet of a gaseous anode outlet stream by a gaseous anode outlet stream line allowing absorption of hydrogen chloride in an ionic liquid introduced into the absorber by an ionic liquid providing inlet, the absorber has an inlet for introducing the gaseous anode outlet stream into the absorber and a first outlet for the ionic liquid containing hydrogen chloride and a second outlet for essentially the gaseous chlorine;

a desorption device for separating the hydrogen chloride from the ionic liquid present in the solvent mass flow;

a recycling line for the transport of hydrogen chloride from the desorption device to the anode inlet or the electrochemical reactor, adapted for conducting a method according to claim 8.

22. The apparatus according to claim 21 further comprising a pressure equipment for applying pressure or vacuum in the distillation device or the absorber.

\* \* \* \* \*